United States Patent
Jaye et al.

(10) Patent No.: US 10,140,633 B1
(45) Date of Patent: Nov. 27, 2018

(54) PLACEMENT OF CONTENT IN A USER INTERFACE

(75) Inventors: Paul Daniel Jaye, Seattle, WA (US); Elmore Eugene Pope, Sammamish, WA (US); Michael L. Brundage, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1612 days.

(21) Appl. No.: 13/155,094

(22) Filed: Jun. 7, 2011

(51) Int. Cl.
*G06Q 30/02* (2012.01)

(52) U.S. Cl.
CPC ................. *G06Q 30/0277* (2013.01)

(58) Field of Classification Search
USPC .......... 705/50–79, 14.54; 707/726; 345/157; 348/78
See application file for complete search history.

(56) References Cited

U.S. PATENT DOCUMENTS

| 8,094,122 B2* | 1/2012 | Molander | G06F 3/013 345/157 |
| 2009/0276315 A1* | 11/2009 | Verma | G06Q 30/02 705/14.54 |
| 2011/0175992 A1* | 7/2011 | Lee | G09F 27/00 348/78 |
| 2013/0254189 A1* | 9/2013 | Kumar et al. | 707/726 |

FOREIGN PATENT DOCUMENTS

WO    WO-2010030475 A1 *    3/2010    ....... G06F 17/30241

* cited by examiner

*Primary Examiner* — Rutao Wu
*Assistant Examiner* — Tarek Elchanti
(74) *Attorney, Agent, or Firm* — Thomas Horstemeyer, LLP

(57) ABSTRACT

Disclosed are various embodiments for placing content in a user interface depending upon a likely location of the gaze of a user. Coordinates are determined that correspond to an area of interest in a viewport of a first user interface. At least one content item of interest is identified and the content items of interest placed in the area of interest.

16 Claims, 13 Drawing Sheets

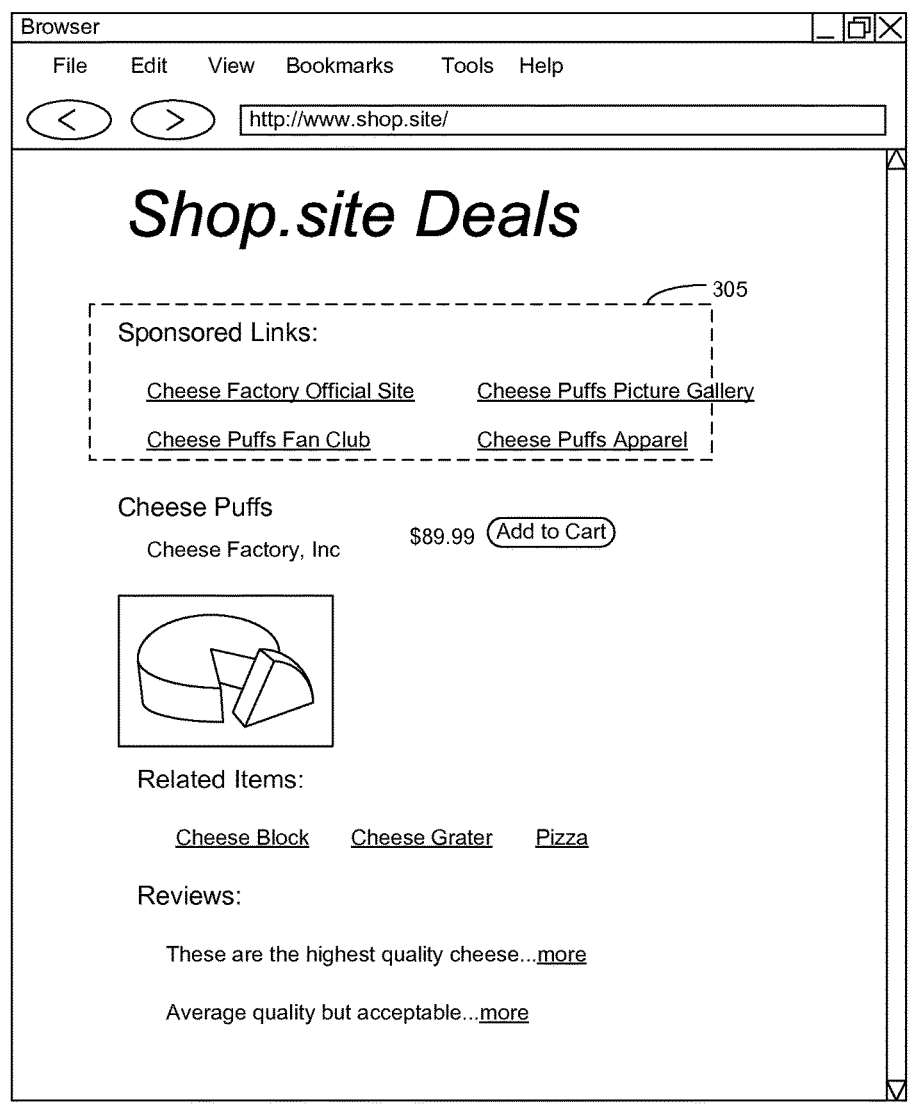
FIG. 4

126e

126f

PLACEMENT OF CONTENT IN A USER INTERFACE

BACKGROUND

User interfaces are often customized based on user preferences, interests, browse history and other factors. Placement of content and/or user interface elements is often dictated by a standardized look and feel or a site-wide set of style guidelines. Placement of content items can be customized based upon other aspects that can be detected about users but often fails to take into account where in a user interface and/or viewport that a user's attention might be focused. Accordingly, placement of content items within a user interface can be optimized if a location of the user's attention within a viewport can be detected.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 3-11 are drawings of example user interfaces rendered by a client in the networked environment of FIG. 1 according to various embodiments of the present disclosure.

DETAILED DESCRIPTION

Embodiments of this disclosure are directed to systems and methods that facilitate placement of content in a user interface based at least upon identification of one or more areas of interest in a viewport as well as a user's interactions with the user interface. The embodiments described herein can encode a content page that is transmitted to and rendered on a client that also facilitates the tracking of movement of an input device in communication with the client. Accordingly, embodiments of the disclosure can identify one or more areas of interest in a viewport associated with a browser executed on the client to view a content page. These areas of interest can include coordinates and/or regions associated with a browser window where, as one example, a user has exhibited behavior associated with gazing at the coordinates and/or region. Consequently, the user interface presented to the user can place certain content within the coordinates and/or region that is associated with the gaze of the user. The same principles can be applied to other types of user interfaces and/or clients, which can include smart-phone and/or tablet devices that may execute special purpose applications that render content that may or may not be generated with assistance or interactions with a content delivery system over a network. A description of one example environment in which one embodiment of the disclosure can be implemented will now be described, followed by a description of operation of the embodiment.

Figure 1:
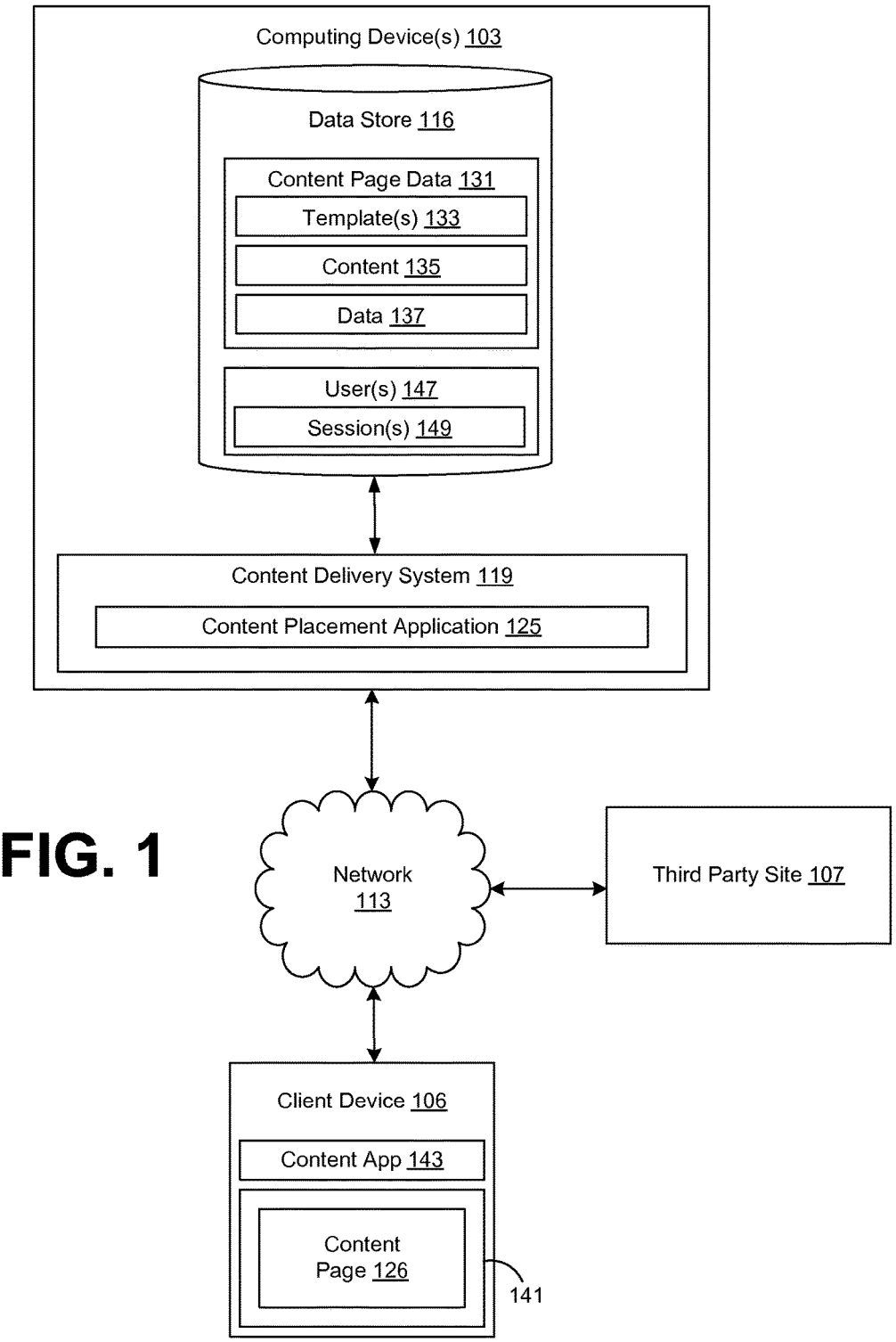
FIG. 1 is a drawing of networked environment according to various embodiments of the present disclosure.

Accordingly, with reference to FIG. 1, shown is a networked environment 100 according to various embodiments. The networked environment 100 includes one or more computing devices 103, and one or more client devices 106 coupled to a network 113. Some embodiments can include one or more third party sites 107 coupled to the network 113. The network 113 includes, for example, the Internet, intranets, extranets, wide area networks (WANs), local area networks (LANs), wired networks, wireless networks, or other suitable networks, etc., or any combination of two or more such networks.

The computing device(s) 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above. A third party site 107 can comprise a Web site, content delivery network, or other system that can deliver content to a client device 106 that may be operated by another party.

Various applications and/or other functionality may be executed in the computing device 103 according to various embodiments. Also, various data is stored in a data store 116 that is accessible to the computing device 103. The data store 116 may be representative of a plurality of data stores as can be appreciated. The data stored in the data store 116, for example, is associated with the operation of the various applications and/or functional entities described below. In one embodiment, the data store 116 can be implemented in one computing device 103, and the other elements depicted can be implemented in other computing devices 103 as can be appreciated.

The content delivery system 119 is one example of an application that is executed on a computing device 103 in order to provide access to content that is served over the network 113. To this end, the content delivery system 119 acts as a gateway through which requests are received and responses transmitted to the clients 106. It is understood that other applications and components, such as, an application implementing the hypertext transport protocol, may be executed on the computing device 103 beyond those described herein.

The computing device 103 may, in some embodiments, provide many different applications that are involved, for example, in providing services offered by an online merchant, a search engine, or other services that involve delivering content over a network 113. For example, the computing device 103 may execute applications that facilitate the ordering of goods online by customers by manipulating a user interface on a client 106. The computing device 103 may also execute a search engine, search indexer, etc., that facilitate the functionality of a search engine.

In one embodiment, the content delivery system 119 can facilitate the generating of dynamic content pages such as, for example, dynamic web pages that are provided to clients 106 in response to various requests. In order to provide content pages, the content delivery system 119 may access the data store 116 to obtain content page data 131, which can include page templates 133, various content items 135, and data 137. The page templates 133 act as templates of content pages, such as dynamic pages that may ultimately be populated with the content 135 and data 137 also stored within the data store 116 or in some way accessible to the content delivery system 119. The content items 135 can specify user interface elements that are arranged in a network page, such as, but not limited to, imagery, a page header, form elements (e.g., text entry fields, buttons, etc.), and other user interface elements as can be appreciated. As contemplated herein, the data store 116 may be representative of many different data stores included in a given system. The data store 116 may comprise, for example, a cloud computing platform in which data is stored.

The page templates 133 can specify the placement of user interface elements with which a user on a client 106 can interact. As a non-limiting example, in an online merchant site implemented by the content delivery system 119, the page template 133 can specify the placement of text, imagery, buttons, etc., which can include user interface elements that facilitate the purchase of an item (e.g., an "Add to Cart" button). As an alternative example, network templates 133 for a search engine implemented by the content delivery system 119 can specify where imagery, search forms, search results, sponsored links, advertisements, etc., are placed on a network page generated by the content delivery system 119 for a user on a client 106. To facilitate the placement of user interface elements according to embodiments of the disclosure, the computing device 103 can also execute a content placement application 125.

As will be described in further detail below, the content placement application 125 can facilitate tracking of navigation input data within a viewport on a client 106 caused by user interactions with a user interface. The content placement application 125 can also determine the placement within a viewport of a user interface of a referrer link that led a user to content served by the content delivery system 119. Depending on the navigation input data received from a client 106 and/or a location of a referrer link on a page that led the user to one served by the content delivery system 119, the content placement application 125 can detect areas of interest in a viewport of a client 106 in which certain content can be placed.

The data store 116 can also include data about users 147 of the content delivery system 119. In some embodiments, each user 147 can be associated with various identification data, profile data, or other data about the user. Additionally, session 149 data can be stored for each user 147 in a content delivery system 119, which can store data regarding navigation input data captured during one or more sessions associated with the user, purchase histories, search histories, and other session data. Additionally, profile data associated with each user 147 can be stored, which can contain information about the users' interests, social networks, location, and other profile data. For example, the content delivery system 119 can capture data relating to movement of an input device (e.g., a mouse, a keyboard, etc.) and store it in session 149 data associated with the user 147. As another example, the content delivery system 119 can capture data relating to a user's purchase history, purchase volume, the likelihood of a user to make a purchase history when visiting an electronic commerce site, and other profile data. With user 147 data and other data, the content placement application 125 can tailor a user interface in a network page generated for the user, as will be described in further detail herein.

The client device 106 is representative of a plurality of client devices 106 that may be coupled to the network 113. The client device 106 may comprise, for example, a processor-based system, such as a computer system. Such a computer system may be embodied in the form of a desktop computer, a laptop computer, a personal digital assistant, a mobile device (e.g. cellular telephone, smart phone, etc.), tablet computing system, set-top box, music players, or other devices with like capability. The client device 106 can also include a display device 141 upon which various content pages 126 and other user interfaces may be rendered. The client device 106 can also include one or more input devices with which a user can interact with a user interface rendered on the display device 141. For example, the client device 106 can include or be in communication with a mouse, touch input device (e.g., capacitive and/or resistive touchscreen), keyboard, or other input devices.

The client device 106 may be configured to execute various applications, such as a content application 143 and/or other applications. The content application 143 may be executed in a client device 106, for example, to access and render content pages 126, such as web pages, or other network content served up by the computing device 103 and/or other servers. In one embodiment, the content application 143 can comprise a browser application. The client device 106 may be configured to execute a special purpose application with which a user can interact with a user interface generated by the content placement application 125 and/or on the device itself. In some embodiments, certain functionality that is described in relation to the content delivery system 119 and/or content placement application 125 can be partially or wholly executed in the client device 106. In other words, a user interface can be generated and/or customized by the content placement application 125 without interactions over a network 113 with the computing device 103.

A content page 126 may be, for example, a dynamic network page such as a dynamic web page or other type of content. For example, while navigating through the various content pages 126 made available through the content delivery system, the browser application 143 may send a request for a specific content page 126 to the content delivery system 119. The content delivery system 119 interfaces with the appropriate application(s) executed on the computing device 103 such as the content placement application 125, as well as any data stores 116 containing data necessary to encode a content page 126 to generate the desired content page 126 that is then transmitted to the browser application 143. In one embodiment, the content delivery system 119 can obtain a page template 133 corresponding to a requested content page 126 as determined by the content placement application 125 and populate the page template 133 to generate the content page 126.

Next, a general description that provides one example of the operation of the various components of the networked environment 100 is provided. The content delivery system 119 can deliver a content page 126 over a network 113 for viewing by a user on a client 106 in a browser application 143. As noted above, the content delivery system 119 can facilitate any type of content system, such as an electronic commerce system, a search engine, a blog network, and others as can be appreciated.

In one embodiment of this disclosure, the content delivery system 119 can generate a content page 126 for transmission to a client that includes client side code (e.g., client side JavaScript executed in a browser), which allows the content placement application 125 to receive data regarding the navigation input of a user as the user interacts with the content page 126 in the browser application 143. In some embodiments, the content page 126 can include client side code to interact with one or more cameras associated with the client 106 and that captures eye position of the user. In another embodiment, the content delivery system 119 can pass a referrer link to the content placement application 125 that reflects a content page that led the user to a content page requested from the content delivery system 119 by the client 106. Using some or all of the above data that can be captured, the content placement application 125 determine one or more areas of interest in a viewport associated with the client 106 at which a user might be gazing or looking. Accordingly, the content placement application 125, when generating a user interface rendered on the client 106, can place certain content elements in or near these areas of interest.

As one example, in an electronic commerce system facilitated by the content delivery system 119, the content placement application 125 can place a buy button in or near such an area of interest in the viewport. As another example, in the case of a search engine facilitated by the content delivery system 119, the content placement application 125 can place sponsored links in or near an area of interest in the viewport. In other words, content that an operator of a site desires for a user to see and/or interact with can be placed in areas of interest identified by the content placement application 125 in a user interface generated for rendering on a client 106.

As one example of identification of an area of interest in a viewport, the content placement application 125 can detect a referrer page that led a user to content that is to be served by the content delivery system 119. In this example, the content placement application 125 can determine the referrer link on the referrer page that the user activated to arrive at such a requested content page. Accordingly, the content placement application 125 can identify coordinates in the x-axis and y-axis in the viewport and identify these coordinates and/or a region surrounding these coordinates as an area of interest. A user often focuses his or her eyes in the area of such a link in order to align a pointer associated with an input device near the link before following the link. As an alternative example, in a touch user interface, the user often focuses his or her eyes in the region of a hyperlink when touching a touch input device to activate a hyperlink. Accordingly, the content placement application 125 can identify such a location in a viewport as an area of interest in which certain content can be placed in a user interface transmitted to a client 106.

In one example, the content placement application 125 can retrieve the referrer page, identify the referrer link in the referrer page and subsequently identify at least one coordinate in the x-axis and/or y-axis in the viewport. In another example, in the case of a sponsored link followed by a user that causes a request for content from the content delivery system 119, the content placement application 125 can determine that the referrer link is a sponsored link purchased by the operator of the content delivery system 119. Accordingly, in many cases, the location in the viewport and/or in a content page of the sponsored link can be specified by the purchase and/or the site from which the sponsored link was purchased. Therefore, the content placement application 125 can determine a location in the viewport of the sponsored link and identify this location as an area of interest.

The content placement application 125 can also identify other areas of interest that are associated with the gaze of a user in a viewport. In one example, a user interface transmitted to a client 106 can include code within a content page 126 that tracks a position of a pointer associated with an input device (e.g., a mouse, a touchscreen, etc.). The client side code can transmit the location of the pointer within a browser window in which the content page 126 is rendered to the content placement application 125. In one embodiment, the content delivery system 119 can embed JavaScript code in the content page 126 to accomplish the above, and other languages should be appreciated.

For example, the content placement application 125 can identify as well as determine placement of user interface elements in these areas or interest for successive content pages 126 that are transmitted to the client 106. In one embodiment, the embedded code can detect a mouse pointer position on a periodic basis, and transmit the mouse pointer position to the content placement application 125 as navigation input data of the user. In one example, the content placement application 125 can then analyze the navigation input data received from the client 106 in order to identify other areas (aside from a location of a referrer link) in the viewport that can be identify as an area in which a user focuses his or her gaze more often relative to another area.

In the above example, the content placement application 125 can be tuned with thresholds so that just because higher levels of navigation input occur in a particular area of a viewport relative to others, such behavior is not always identified as a user tendency that causes adjustment of placement of content by the content placement application 125. In other words, in one embodiment, the content placement application 125 can be tuned such that the navigation input data received from the client 106 must reveal that the amount of navigation input in a particular area of a viewport exceeds the amount of input in other areas of the screen by a predefined threshold, such as a minimum percentage of time the user spends viewing the content page 126, so that false positive areas of interest are not identified. As one example, the content placement application 125 can be tuned such that in order to identify such an area of interest, the navigation input must reflect that the user hovers a mouse pointer over a one inch area of the browser window for at least fifty percent of the time the user spends viewing the content page 126. Other examples of establishing such predefined thresholds should be appreciated. Having described generally the identification of areas of interest, reference is now made to FIGS. 2-9, which illustrates other examples of ways that the content placement application 125 can identify areas of interest as well as customize a user interface according to the user's profile as well as other factors.

Figure 2:
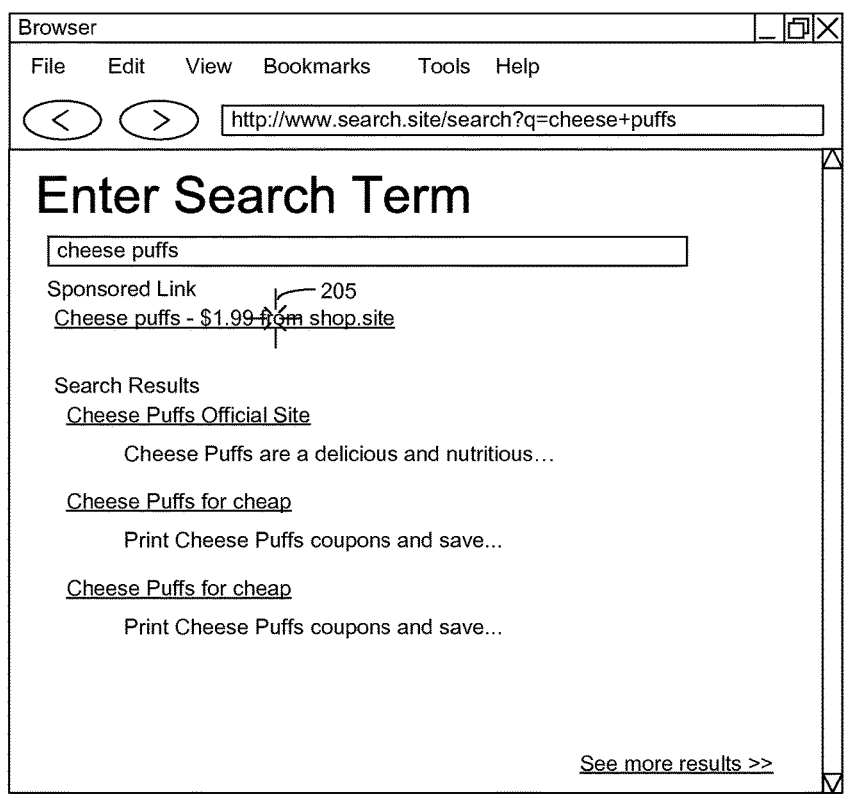
FIG. 2 is a drawing of an example of a user interface rendered by a client in the networked environment of FIG. 1 that is generated by a third party site according to various embodiments of the present disclosure.

FIG. 2 depicts a content page 126 generated by a third party site 107 that contains a link 205 that causes a request for content from the content delivery system 119. In the depicted example, a search engine can provide a search results page that includes one or more search results. The search results page can also include one or more sponsored links. In some embodiments, sponsored links can be placed in various locations in a content page 126 and transmitted to a client 106. In the depicted example, the link 205 leads to a request for content from the content delivery system 119. Therefore, if a user follows the link 205, the content delivery system 119 can pass the referrer link to the content placement application 125, which can determine the location in the viewport of the link 205 and designate the location as an area of interest. In one embodiment, the link 205 can uniquely identify the search results page in which it is placed, and, in some cases, the location on the search results page can be known, as the sponsored link was purchased by the operator of the content delivery system 119. As one example, the content placement application 125 can determine the coordinates in the viewport that reflect the location of the link 205 in the search results page.

In other cases, links that cause a request for content from the content delivery system 119 may not be sponsored links. Accordingly, the content placement application 125 can receive a uniform resource locator (URL) of the referrer page (e.g., the URL of the search results page in the depicted example). In some embodiments, the content placement application 125 can retrieve the referrer page and identify the location (e.g., coordinates) of the referrer link in the referrer page. In this example, the location of the referrer link and/or a region surrounding the referrer link can be designated as an area of interest in the viewport of the user interface.

Figure 3:
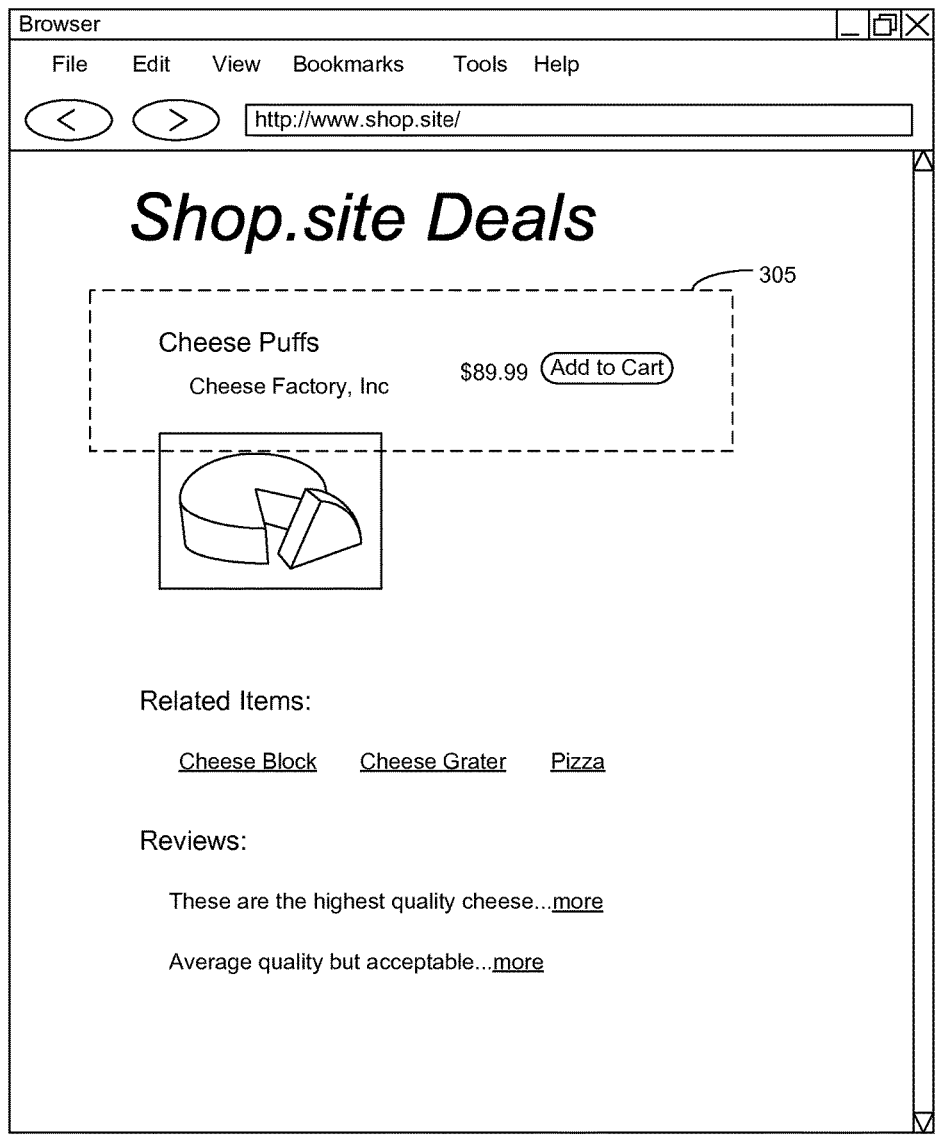

Reference is now made to FIG. 3, which continues the example of FIG. 2. FIG. 3 depicts a content page 126b that is served by the content delivery system 119 to a client 106. FIG. 3 illustrates an example of a content page 126b in which content is placed in an area of interest identified by the content placement application 125. In some embodiment the content placement application 125 can prioritize content that is considered important and select a page template 133 that specifies that the content considered important by the content placement application 125 is located in or near an area of interest. The content placement application 125 can also prioritize content according to various aspects about a user. For example, the content placement application 125 can examine a purchase history, search history, or other data from a user profile and place content in or near an area of interest based on the use profile data. In the depicted example, the content placement application 125 has identified an area of interest 305 that is at or near the location of the referrer link described with reference to FIG. 2. Therefore, in one example, the content placement application 125 can determine whether user profile data associated with the user reflects that the user is a high volume purchaser of items from an electronic commerce system facilitated by the content delivery system 119. If so, the content placement application 125 can place information about one or more products, such as product imagery, description, pricing and/or a buy button that allows the user to add the product to a virtual shopping cart.

Continuing the example of FIG. 3, reference is now made to FIG. 4, which depicts an alternative content page 126c that can be generated by the content placement application 125 and customized based upon user profile data. In the example shown in FIG. 4, the content placement application 125 can determine from user profile data about the user that the user is less likely to purchase an item than in the example of FIG. 3. Accordingly, the content placement application 125 can determine that different content should be place in the area of interest 305. In the depicted example, the content placement application 125 can place sponsored links in the area of interest 305 if it can determine that the user is unlikely to purchase the item shown in the content page 126c. In some examples, if a user account associated with a user cannot be identified (e.g., an anonymous user), the content placement application 125 can employ a page template associated with an anonymous user that includes content considered important to display to anonymous users in the area of interest 305.

Figure 5:
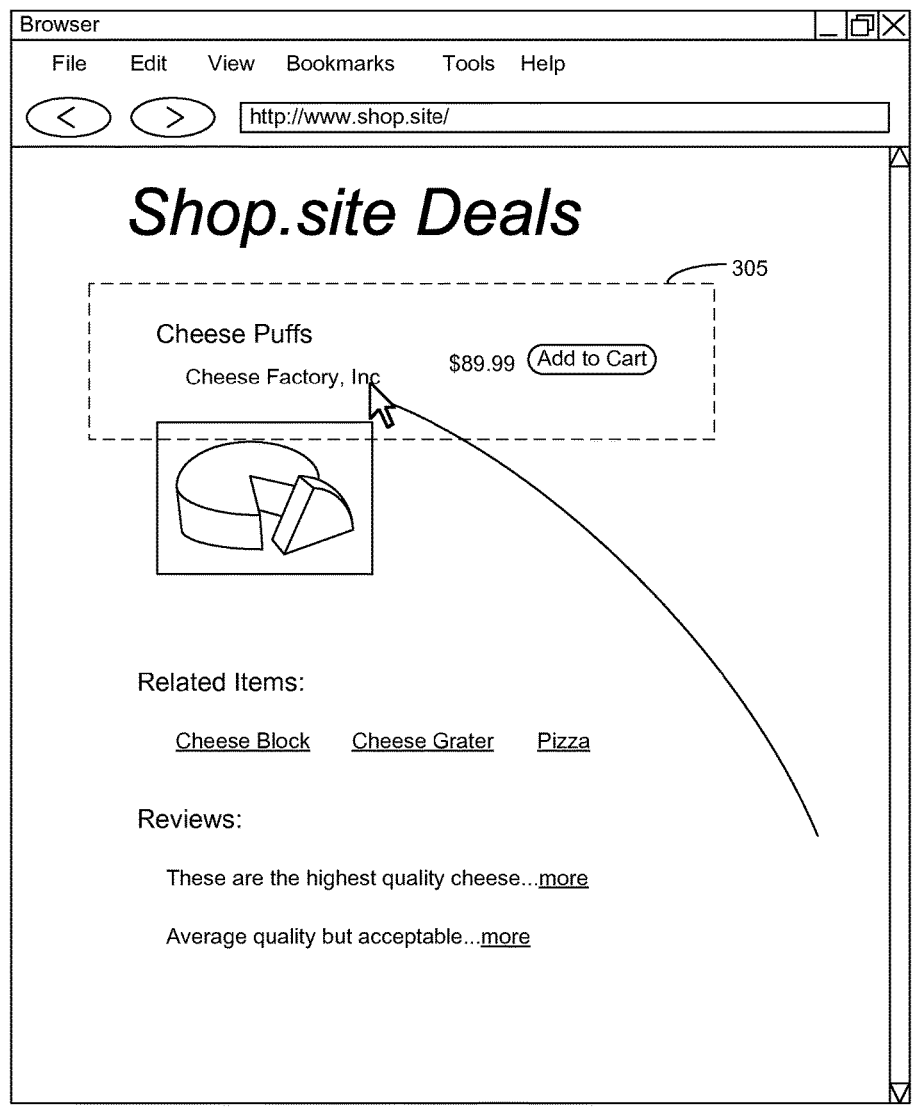

Reference is now made to FIG. 5, which illustrates one example of identification of additional areas of interest that can be associated with a likely gaze of a user in a viewport. The content placement application 125 can, if a user follows a link to a content page 126d generated by the content delivery system 119, determine a next likely location within the viewport at which a user is likely to gaze. In the depicted example, the content placement application 125 can determine the location of a referrer link that the user followed to access the depicted content page 126d. Accordingly, the content placement application 125 can also predict a next likely gaze point by assuming that the user may gaze at an area of the viewport in which he or she moves the mouse pointer or other input device.

Figure 6:
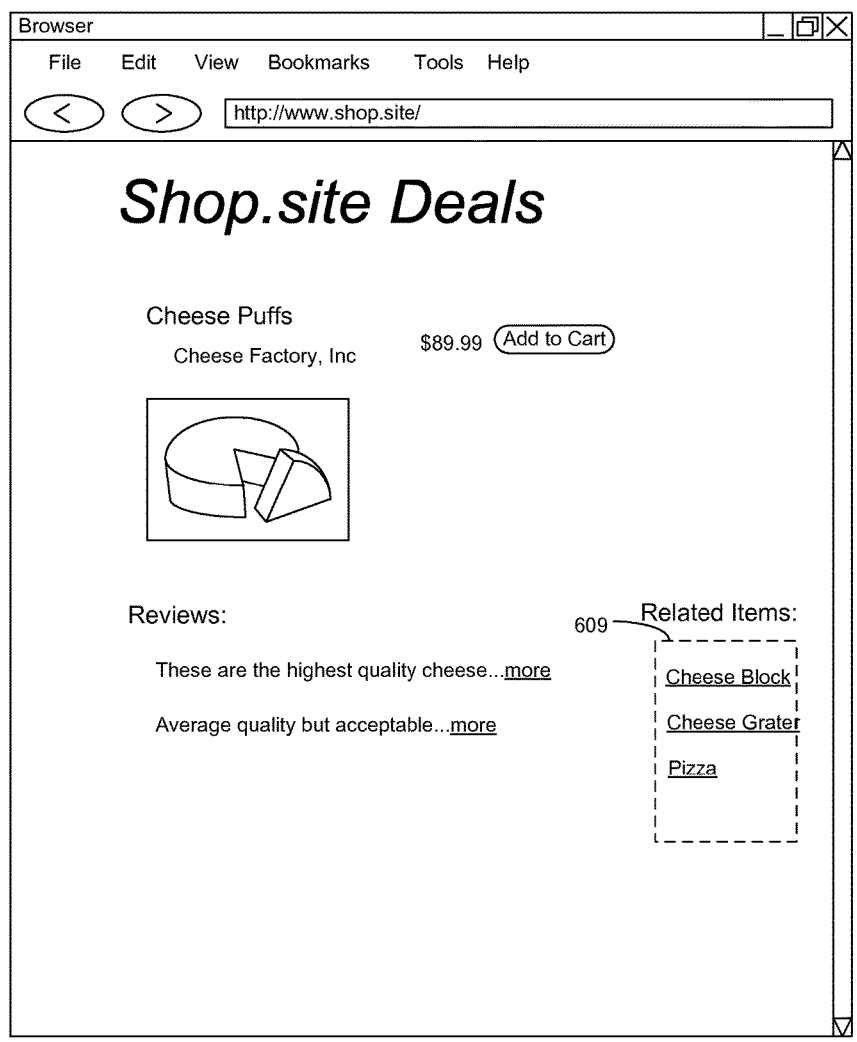

Because users often move a mouse in arc shaped paths, the content placement application 125 can project one or more arc shaped movements from a location of a referrer link and/or area of interest 305 and designate an endpoint of such a movement as a second area of interest. In some embodiments, a user may employ alternative pointing or input devices that may result in varying shaped paths that can be used to predict a second area of interest. As one example, a user may use a touchpad, or a pointing device with a tactile sensor. As a result, these users may mouse a pointer in straight lines. Therefore, the second area of interest can be predicted as located in a straight line from a first area of interest. FIG. 6 illustrates one example of how the content placement application 125 can customize a user interface by projecting a next likely area associated with the gaze of a user. In the depicted example content page 126e, the content placement application 125 can identify a second area of interest 609 and place at least a portion of content items in or near the second area of interest 609.

Figure 7:
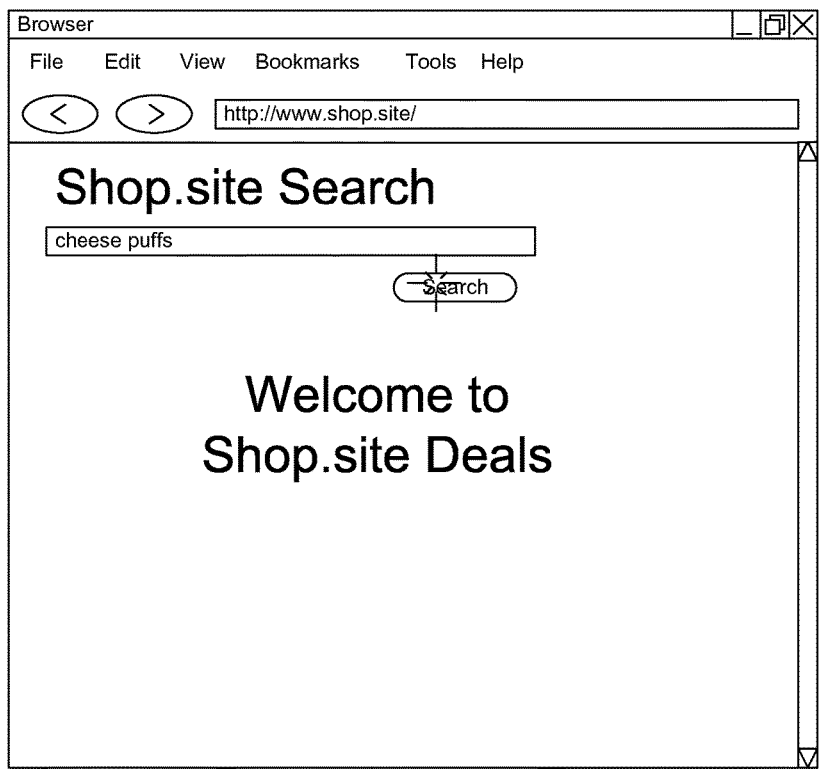

Reference is now made to FIG. 7, which depicts an example of a content page 126f that can be generated by a content delivery system 119. In the example of FIG. 7, the content placement application 125 can identify an area of interest based at least upon a hyperlink, form button, form field or other user interface element from which a user initiates a request for content from the content delivery system 119. In this example, the content placement application 125 can identify a region around the depicted search button as the area of interest in which certain content items can be placed. The form button can also be placed in an area in the content page that it is desired to focus the user's attention, and subsequent content pages can place content items of interest in or around an area of the form button.

Figure 8:
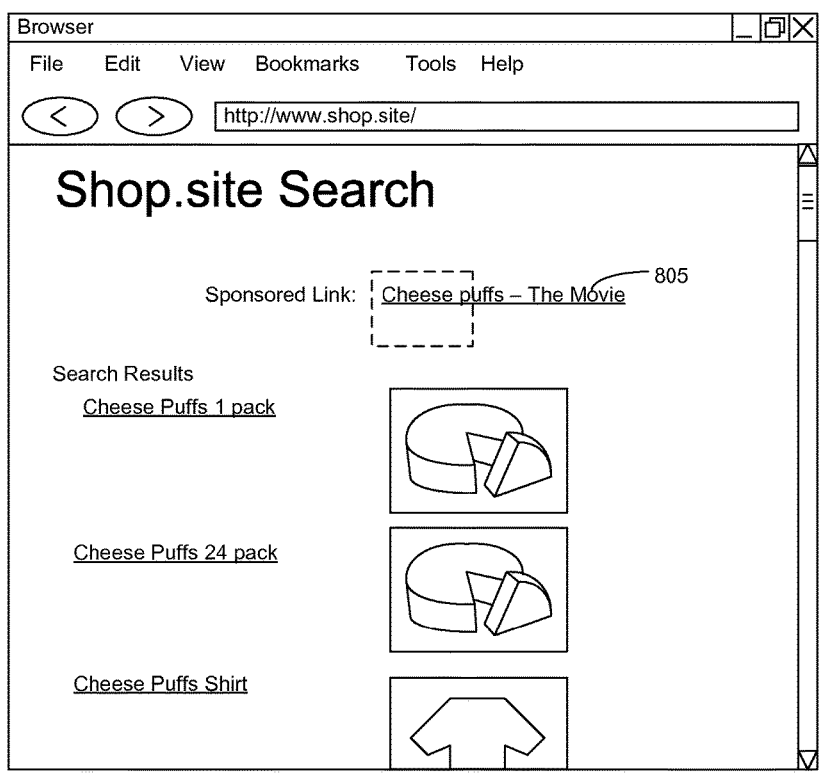

Continuing the example of FIG. 7, reference is now made to FIG. 8, which depicts an example a content page 126g that is customized by the content placement application 125. As noted in FIG. 7, the content placement application can determine the location of a referrer link, form element, or other user interface element causing a request for the content page 126g shown in FIG. 8. As in the previously shown examples above, the content placement application 125 can place a content item of interest (e.g., sponsored link, purchasing user interface element, etc.) in or near the area of interest 805. Additionally, the content placement application 125 can place content items that are in or near another region of the viewport after a scroll event.

In some embodiments, the content placement application 125 can determine the speed with which a user scrolls within a content page and asynchronously update a second area of interest that is offset from the first area of interest. In this example, the second area of interest can be calculated based upon the scroll speed of a user, which can be determined by employing client side code embedded in a content page that can track scroll events initiated by the user.

Figure 9:
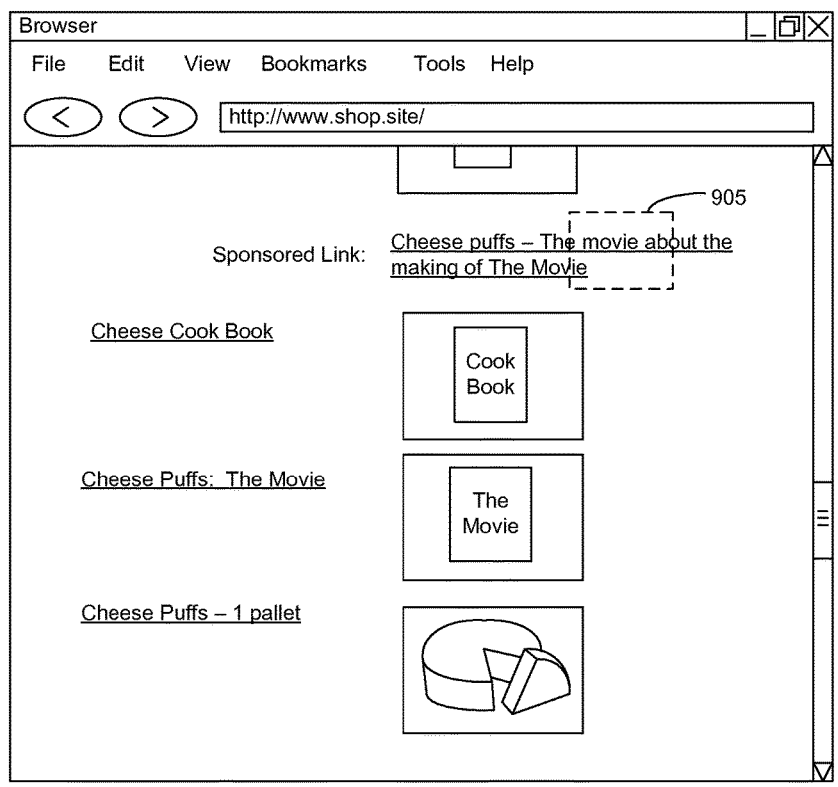

Therefore, reference is now made to FIG. 9, which depicts a viewport in a client rendering the content page 126*g* of FIG. 8 after a scroll event. In the depicted example, the scroll event (e.g., page down event) causes the browser window to render a different area of the content page 126*g* in the viewport. Accordingly, the content placement application 125 can identify another region of the user interface that is offset from the first area of interest at a distance equal to one or more scroll events and identify this region as another area of interest 905. The content placement application 125 can place certain content within this other area of interest. In some embodiments, the content page 126*g* may necessitate scrolling in another direction (e.g., horizontal scrolling and/or swiping). Therefore, the content placement application 125 can determine an orientation of the content page 126*g*, determine other areas of interest after scroll events that are located offset from the first area of interest, and place content within other areas of interest that could arise after these scroll events.

Figure 10:
Figure 11:
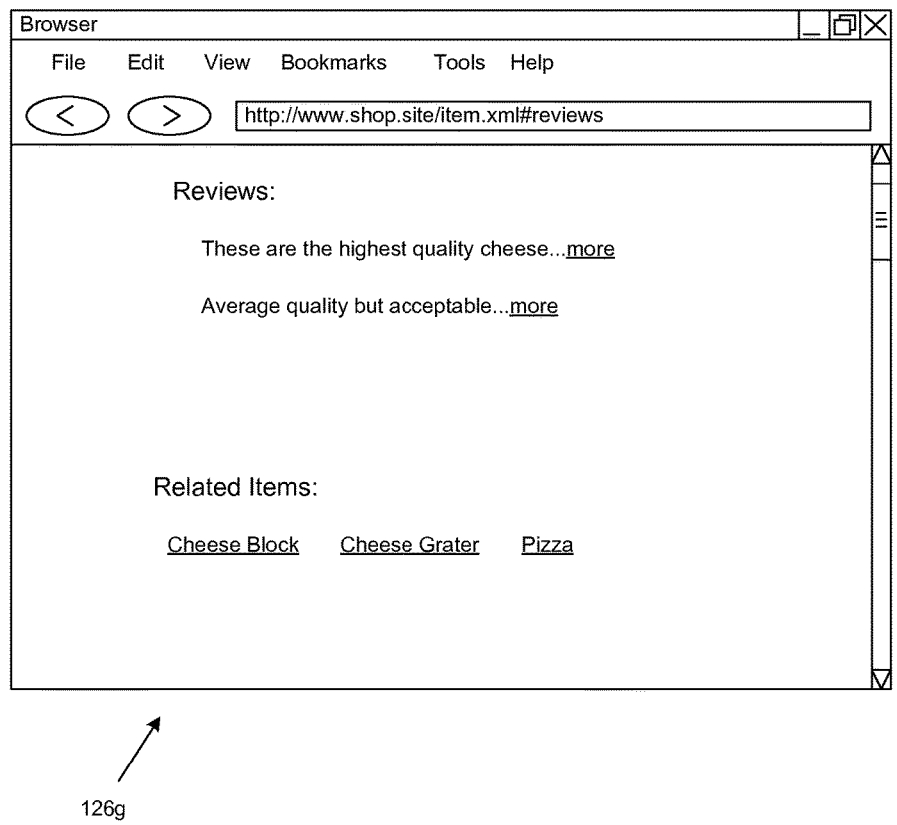

FIG. 10 depicts an alternative content page 126*h* in which a hyperlink may link to another portion of the content page. In this example, the hyperlink followed by the user may cause a user to skip over content that it is desired for the user to see. In the depicted example, a user may follow a hyperlink 701 that causes the user to arrive at a portion of the content page that is not rendered within the browser. It may be desired that the "related items" in the depicted example are content items of interest that should be shown to the user Therefore, the example is continued in FIG. 11, in which it is shown that the portion of the content page 126*g* not rendered in the browser in FIG. 10 can be asynchronously updated and populated with the "related items" so that this particular content item of interest is shown to the user.

Figure 12:
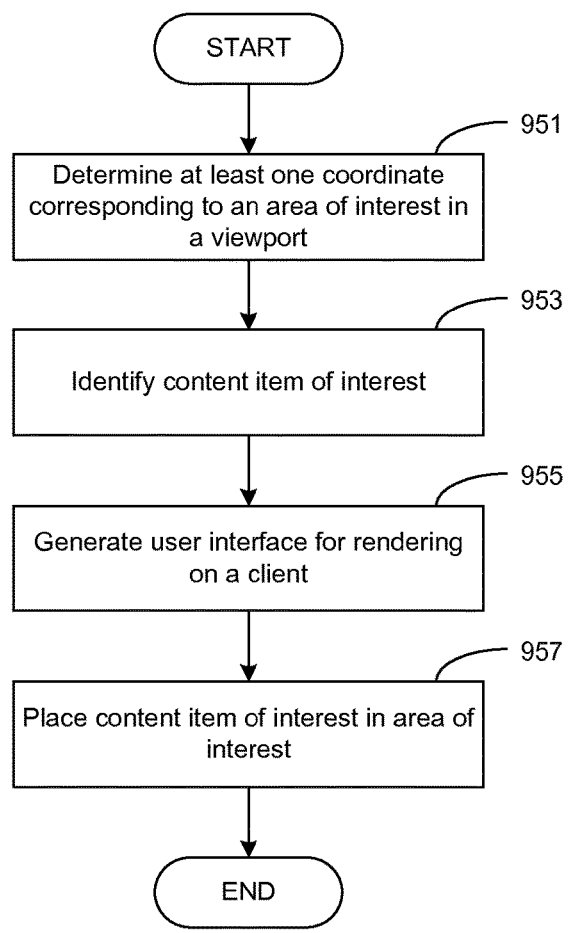
FIG. 12 is a flowchart illustrating one example of functionality implemented as portions of the content placement application executed in a computing device in the networked environment of FIG. 1 according to various embodiments of the present disclosure.

Referring next to FIG. 12, shown is a flowchart that provides one example of the operation of a portion of the content placement application 125 according to various embodiments. It is understood that the flowchart of FIG. 12 provides merely an example of the many different types of functional arrangements that may be employed to implement the operation of the portion of the content placement application 125 as described herein. As an alternative, the flowchart of FIG. 10 may be viewed as depicting an example of steps of a method implemented in the computing device 103 (FIG. 1) according to one or more embodiments.

Beginning with box 951, the content placement application can identify an area of interest in a viewport associated with a client 106. As noted above, the area of interest can be identified by determining a location associated with a referrer link and/or areas in which a mouse pointer or other input device is located and/or idling in the viewport by the user. In box 953, the content placement application 125 can identify content item of interest from among the content in the requested content page. In box 955, the content placement application 125 can generate a user interface for transmission and/or rendering on a client 106, in which the content item of interest can be placed within or near the area of interest in box 957.

Figure 13:
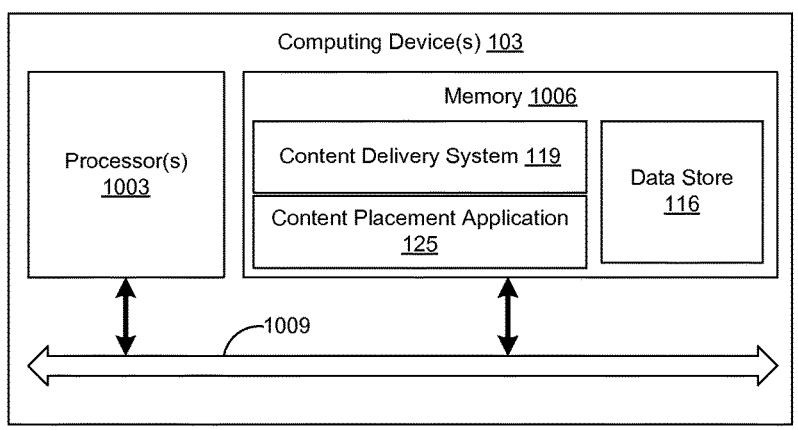
FIG. 13 is a schematic block diagram that provides one example illustration of a computing device employed in the networked environment of FIG. 1 according to various embodiments of the present disclosure.

With reference to FIG. 13, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the content delivery system 119, content placement application 125, and potentially other applications. Also stored in the memory 1006 may be a data store 116 and other data. In addition, an operating system may be stored in the memory 1006 and executable by the processor 1003.

It is understood that there may be other applications that are stored in the memory 1006 and are executable by the processors 1003 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 113 that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the content delivery system 119, content placement application 125, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 12 shows the functionality and operation of an implementation of portions of the content placement application 125. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowchart of FIG. 12 shows a specific order of execution, it is understood that the order of execution may differ from that which is depicted. For example, the order of execution of two or more blocks may be scrambled relative to the order shown. Also, two or more blocks shown in succession in FIG. 12 may be executed concurrently or with partial concurrence. Further, in some embodiments, one or more of the blocks shown in FIG. 12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content placement application 125, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium having a plurality of computer instructions, wherein, when executed by a computing device, the plurality of computer instructions cause the computing device to:

generate a referrer page associated with a request for content, the referrer page being rendered on a client before a current content page rendered on the client;

identify at least one coordinate in a viewport associated with a referrer link in the referrer page;

designate a first area of interest around the at least one coordinate in the viewport, the at least one coordinate being determined based at least upon a position of a user input associated with the client rendering the referrer page, the user input being at least one of a mouse click or a touch input that activated the referrer link within the referrer page, the first area of interest being designated based at least in part upon a comparison between a first amount of user input in the first area of interest and a second amount of user input in at least one other coordinate in the viewport, wherein the first amount exceeds the second amount by a predefined threshold;

identify a second area of interest that is offset from the first area of interest, the second area of interest corresponding to a position in the viewport after a scroll event;

generate a user interface with at least a portion of a first content item placed within the first area of interest in response to activation of the referrer link within the referrer page, the user interface corresponding to the current content page associated with the referrer link;

place at least a portion of a second content item within the second area of interest; and transmit the user interface to the client.

2. The non-transitory computer-readable medium of claim 1, wherein the plurality of computer instructions further cause the computing device to:
- identify a third area of interest, the third area of interest being located in a region of the viewport located in a path of an arc from the first area of interest, the arc corresponding to a mouse movement; and
- place at least a portion of a third content item within the third area of interest within the user interface.

3. A system, comprising:
- at least one computing device; and
- a plurality of computer instructions executable by the at least one computing device, wherein, when executed, the plurality of computer instructions cause the at least one computing device to:
  - generate a first user interface associated with a request for content, the first user interface being rendered on a client before a current content page rendered on the client;
  - identify at least one coordinate in a viewport associated with a referrer link in the first user interface;
  - designate an area of interest around the at least one coordinate in the viewport, the at least one coordinate corresponding to a location within the viewport of the referrer link, the at least one coordinate being determined based at least upon a position of a user input associated with the client rendering the first user interface, the user input being at least one of a mouse click or a touch input that activated the referrer link within the first user interface, the area of interest being designated based at least in part upon a comparison between a first amount of user input in the area of interest and a second amount of user input in at least one other coordinate in the viewport, wherein the first amount exceeds the second amount by a predefined threshold;
  - identify at least one content item of interest associated with a second user interface, the second user interface corresponding to the current content page generated in response to activation of the referrer link within the first user interface; and
  - generate the second user interface with the at least one content item of interest placed in the area of interest.

4. The system of claim 3, wherein the plurality of computer instructions further cause the at least one computing device to:
- identify at least one region in the second user interface that is offset from the at least one coordinate, the at least one region corresponding to a position in the second user interface that corresponds to the at least one coordinate in the viewport after at least one scroll event; and
- place a second at least one content item of interest in the at least one region.

5. The system of claim 4, wherein the plurality of computer instructions further cause the at least one computing device to:
- determine an orientation of the second user interface;
- determine a size of the viewport;
- calculate a distance associated with the scroll event based at least upon the size of the viewport; and
- place the second at least one content item in the at least one region.

6. The system of claim 3, wherein the plurality of computer instructions further cause the at least one computing device to generate a prediction of another area of interest located in the viewport based at least in part upon the at least one coordinate by calculating at least one other coordinate located in an arc originating from the at least one coordinate.

7. The system of claim 3, wherein the plurality of computer instructions further cause the at least one computing device to:
- identify a user profile associated with the user; and
- generate at least one content item of interest to the user based at least upon interests of the user retrieved from the user profile.

8. A method, comprising:
- detecting, in at least one computing device, a referrer page associated with a request for a user interface, the referrer page being rendered on a client before the user interface;
- identifying, in the at least one computing device, a location in a viewport corresponding to a referrer link associated with the request for content, the location being determined based at least upon a position of a user input associated with the client rendering the referrer page, the user input being at least one of a mouse click or a touch input that activated the referrer link within the referrer page;
- designating, in the at least one computing device, an area of interest around the location, the area of interest being designated based at least in part upon a comparison between a first amount of user input in the area of interest and a second amount of user input in at least one other location in the viewport, wherein the first amount exceeds the second amount by a predefined threshold;
- identifying, in the at least one computing device, a user profile associated with the user initiating the request for content;
- selecting, in the at least one computing device, at least one content item associated with the user profile; and
- generating, in the at least one computing device, the user interface with at least a portion of the at least one content item located within the area of interest, the user interface corresponding to a content page generated in response to activation of the referrer link within the referrer page.

9. The method of claim 8, wherein identifying a location in a viewport of a referrer link associated with the request for content further comprises:
- retrieving, in the at least one computing device, the referrer page;
- identifying, in the at least one computing device, the referrer link in the referrer page; and
- detecting, in the at least one computing device, at least one coordinate within the viewport that is associated with the referrer link.

10. The method of claim 8, further comprising:
- identifying, in the at least one computing device, at least one region corresponding to another position in the viewport after at least one scroll event;
- designating, in the at least one computing device, the at least one region as a second area of interest; and
- placing, in the at least one computing device, a second content item in the at least one region.

11. The method of claim 10, further comprising:
- determining, in the at least one computing device, an orientation of the user interface;
- determining, in the at least one computing device, a size of the viewport;
- calculating, in the at least one computing device, a distance associated with the scroll event based at least upon the size of the viewport; and placing, in the at least one computing device, the second content item in the at least one region.

12. The method of claim 8, further:

identifying, in the at least one computing device, at least one region that is offset from the area of interest by an arc;

designating, in the at least one computing device, the at least one region as a second area of interest; and placing, in the at least one computing device, a second content item in the at least one region.

13. The method of claim 8, wherein generating the user interface with the at least a portion of the at least one content item located within the area of interest further comprises:

determining, in the at least one computing device, whether a purchase history associated with the user profile meets a predefined threshold; and placing, in the at least one computing device, a user interface element causing a product to be placed into a virtual shopping cart in the area of interest.

14. The method of claim 8, wherein generating the user interface with the at least a portion of the at least one content item located within the area of interest further comprises:

determining, in the at least one computing device, whether a purchase history associated with the user profile does not meet a predefined threshold; and placing, in the at least one computing device, a sponsored link in the area of interest.

15. The method of claim 8, wherein generating the user interface with the at least a portion of the at least one content item located within the area of interest further comprises:

determining, in the at least one computing device, whether a user account associated with a request to generate the user interface is associated with an anonymous user; and placing, in the at least one computing device, a sponsored link in the area of interest.

16. The non-transitory computer-readable medium of claim 1, wherein the plurality of computer instructions further cause the computing device to:

identify a region that is offset from the second area of interest;

determine an orientation of the user interface;

determine a size of the viewport;

calculate a distance associated with the scroll event based at least upon the size of the viewport; and place a third at least one content item in the region.

* * * * *